United States Patent
Rennett

(10) Patent No.: US 6,702,468 B2
(45) Date of Patent: Mar. 9, 2004

(54) SLIDING BEARING FOR A MAGNETICALLY DRIVEN CENTRIFUGAL PUMP

(75) Inventor: Ulrich Rennett, Schwalmtal (DE)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/001,309

(22) Filed: Nov. 28, 2001

(65) Prior Publication Data

US 2003/0099415 A1 May 29, 2003

(30) Foreign Application Priority Data

Dec. 12, 2000  (DE) .......................................... 100 61 049

(51) Int. Cl.[7] .............................................. F16C 17/10
(52) U.S. Cl. ...................... 384/296; 384/297; 384/416; 384/903; 384/907.1
(58) Field of Search ................................ 384/107, 275, 384/276, 297, 416, 903, 907.1, 296

(56) References Cited

U.S. PATENT DOCUMENTS

| 267,796 A | 11/1882 | McKee |
| 1,373,906 A | 4/1921 | Needham |
| 1,474,192 A | 11/1923 | Gessler et al. |
| 4,428,689 A | * 1/1984 | Choate ........................ 384/296 |
| 4,717,268 A | * 1/1988 | Orkin ........................ 384/280 |
| 5,380,112 A | * 1/1995 | Schicktanz et al. ......... 384/278 |

FOREIGN PATENT DOCUMENTS

| CH | 171 111 A | 8/1934 |
| DE | 1 600 894 A | 4/1970 |
| DE | 29 50414 A1 | 6/1982 |
| GB | 528 010 A | 10/1940 |

* cited by examiner

Primary Examiner—William C. Joyce

(57) ABSTRACT

A sliding bearing is provided for a magnetically driven centrifugal pump with an outer stationary tubular bearing housing within which lie antirotationally mounted bearing bushings and with a rotationally mounted hollow bearing shaft, lying coaxially in the bearing housing to accommodate the pump impeller shaft, having bearing sleeves, lying within the bearing bushings. Contacting the end faces of the bearing bushings on the outer side lie axial bearing rings which are in each case held by an outer axial disc arranged on or alongside the bearing shaft at both ends. The sliding bearing constitutes a preassembled unit, the parts of which are captively mounted to one another. The two axial discs at the end faces are fastened to or alongside the bearing shaft and hold the bearing shaft with its bearings within the bearing housing.

9 Claims, 1 Drawing Sheet

SLIDING BEARING FOR A MAGNETICALLY DRIVEN CENTRIFUGAL PUMP

BACKGROUND OF THE INVENTION

1. Field of the Invention

The invention concerns a sliding bearing for a magnetically driven centrifugal pump with an outer stationary tubular bearing housing within which lie antirotationally mounted bearing bushings, in particular made of ceramics, and with a rotationally mounted hollow bearing shaft, lying coaxially in the bearing housing to accommodate the pump impeller shaft, having bearing sleeves, in particular made of ceramics, lying within the bearing bushings, whereby, contacting the end faces of the bearing bushings on the outer side, lie axial bearing rings which are in each case held by an outer axial disc arranged on or alongside the bearing shaft at both ends.

2. Description of Related Art

Sliding bearings for magnetically driven centrifugal pumps are known. A failure of the bearing in many cases also results in damage to the pump. The bearings are of relatively complex design and consist of combinations of axial and radial bearings. The sliding bearing surfaces require to be precisely aligned relative to one another. This frequently necessitates very time-consuming metrological inspection. Plant mechanics often do not possess sufficient knowledge to perform these inspections, which practically constitutes a recipe for renewed damage. Today, great emphasis is laid on short maintenance and repair times, since the costs involved are very high.

From DE 296 10 799 U1 a sliding bearing for a magnetically driven centrifugal pump is known in which, unlike the design type given in the preamble of claim 1, instead of a hollow bearing shaft with bearing sleeves, the bearing sleeves are arranged directly on the pump impeller shaft with a spacer sleeve. Furthermore, from DE 92 04 349 U1 a sliding bearing arrangement is known in which a hollow bearing shaft arranged on the pump impeller shaft simultaneously forms the bearing sleeve of the sliding bearing.

In both cases the rotating parts of the sliding bearing are mounted individually on the pump impeller shaft together with the axial discs at their end faces.

SUMMARY OF THE INVENTION

The object of the invention is to create a sliding bearing, the installation and dismantling of which as well as maintenance and repair are simpler and more accurate and require less time.

This problem is solved according to the invention in that the sliding bearing constitutes a pre-assembled unit, the parts of which are captively mounted to one another, whereby the two axial discs at the end faces are fastened to or alongside the bearing shaft and hold the bearing shaft with its bearings within the bearing housing.

The sliding bearing according to the invention constitutes a unit (cartridge) pre-assembled by the manufacturer. This unit takes optimal account of all adjustment dimensions. During installation, only the pre-assembled unit requires to be bolted on, which saves a great deal of time and avoids error sources.

It is especially advantageous when grooves to hold the axial discs are worked into the outer circumference of the bearing shaft, in each of which lies a circlip against which the axial disc abuts. It is also advantageous when an annular bearing flange is fastened, in particular bolted, to the outer shell of the bearing housing.

BRIEF DESCRIPTION OF THE DRAWING

An embodiment of the invention is illustrated in a sole drawing which shows an axial cross-section of a sliding bearing in accordance with the present invention.

DETAILED DESCRIPTION OF THE INVENTION

Figure 1:
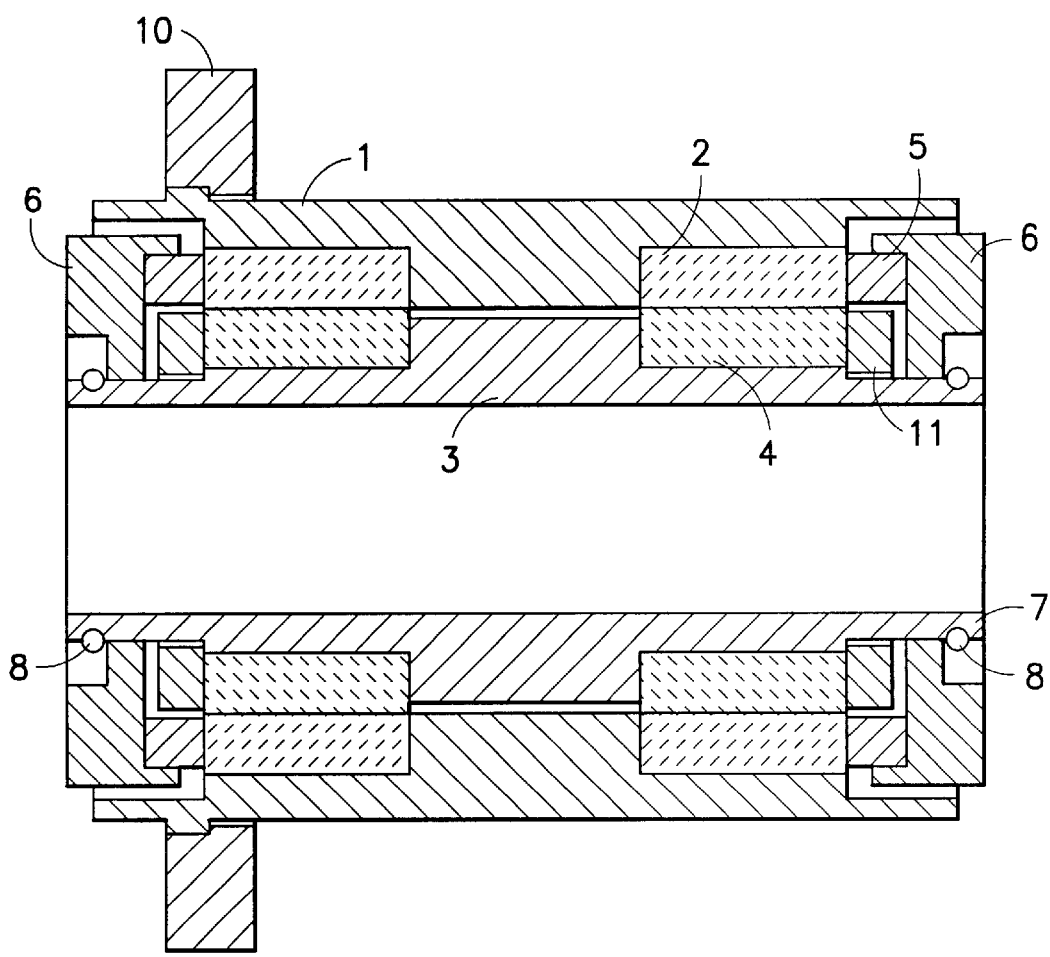

An outer bearing housing 1 forms, with the integrated ceramic bearing bushings 2 and the bearing flange 10, the stationary radial bearing. The rotating radial bearing, consisting of the hollow bearing shaft 3, the two ceramic bearing sleeves 4 and the shaft nuts 11, is inserted into the complete bearing housing 1. The two axial bearings, consisting of the axial bearing rings 5 and the axial discs 6, are mounted in a slightly axially shiftable manner on the shaft 3. Their axial freedom of movement is approximately 0.5 mm. In order that these components constitute a captive unit (cartridge), circlips 8 are arranged on either side of the shaft in grooves 7 such that the axial discs 6 are fixed in place. Thanks to these integrated design features, when the cartridge is installed in the pump achieves the sliding bearing surfaces automatically correctly self-align relative to one another. No further action is required on the part of the assemblyman.

Inside the hollow bearing shaft 3 lies the shaft (not shown) of the impeller of the radial pump. On the side facing away from the impeller the inner magnet rotor of the magnetic drive is fastened to the shaft, whereby the magnet rotor surrounds the sliding bearing. The inner magnet rotor is surrounded by the outer magnet rotor driven by an electric motor, whereby a slotted tube lies between the two magnet rotors.

What is claimed is:

1. A sliding bearing for a magnetically driven centrifugal pump, comprising:

an outer stationary tubular bearing housing (1);

antirotationally mounted bearing bushings (2) arranged therein;

a rotationally mounted hollow bearing shaft (3) arranged coaxially for rotating inside the outer stationary tubular bearing housing (1) to accommodate a pump impeller shaft of the magnetically driven centrifugal pump;

bearing sleeves (4) concentrically arranged between the rotationally mounted hollow bearing shaft (3) and the antirotationally mounted bearing bushings (2);

axial bearing rings (5) abutting end faces of the antirotationally mounted bearing bushings (2);

shaft locking nuts (11) for fixedly engaging the rotationally mounted hollow bearing shaft (3), for abutting against the bearing sleeve (4) and for holding the same in an axial relation thereto;

outer axial discs (6) abutting end faces of the axial bearing rings (5) for fastening on or alongside the rotationally mounted hollow bearing shaft (3) and for holding the rotationally mounted hollow bearing shaft (3) with the bearing sleeves (4) as well as the axial bearing rings (5) within the outer stationary tubular bearing housing (1); and the sliding bearing forming a pre-assembled unit for captively fixing or mounting together the outer stationary tubular bearing housing (1), the antirotationally mounted bearing bushings (2), the bearing shaft (3), the bearing sleeves (4), the axial bearing rings (5), outer axial discs (6) and shaft locking nuts (11) with the pump impeller shaft for coupling to the magnetically driven centrifugal pump.

2. A sliding bearing according to claim 1, wherein the outer circumference of the bearing shaft (3) has grooves (7), and each of the grooves (7) has a circlip (8) arranged therein against which each axial disc (6) abuts to retain the axial discs (6) in the sliding bearing.

3. A sliding bearing according to claim 2, wherein an annular bearing flange (10) is fastened to the outer shell of the bearing housing (1).

4. A sliding bearing according to claim 1, wherein an annular bearing flange (10) is fastened to the outer shell of the outer stationary tubular bearing housing (1).

5. A sliding bearing according to claim 1, wherein the antirotationally mounted bearing bushings (2) is made of ceramic.

6. A sliding bearing according to claim 1, wherein the bearing sleeves (4) is made of ceramic.

7. A sliding bearing according to claim 1, wherein the outer stationary tubular bearing housing (1) and antirotationally mounted bearing bushings (2) form a stationary radial bearing arrangement.

8. A sliding bearing according to claim 1, wherein the bearing shaft (3), the bearing sleeves (4) and the axial bearing rings (5) form a rotating bearing arrangement.

9. A sliding bearing according to claim 1, wherein the axial bearing rings (5) and axial discs (6) form an axial bearing arrangement.

* * * * *